US010055071B2

(12) United States Patent
Jin et al.

(10) Patent No.: US 10,055,071 B2
(45) Date of Patent: Aug. 21, 2018

(54) ARRAY SUBSTRATE AND METHOD FOR FORMING THE SAME, METHOD FOR DETECTING TOUCH-CONTROL OPERATION OF TOUCH-CONTROL DISPLAY APPARATUS

(71) Applicants: Shanghai AVIC OPTO Electronics Co., Ltd., Shanghai (CN); Tianma Micro-Electronics Co., Ltd., Shenzhen (CN)

(72) Inventors: Huijun Jin, Shanghai (CN); Zhongshou Huang, Shanghai (CN); Song Ye, Shanghai (CN)

(73) Assignees: SHANGHAI AVIC OPTO ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 122 days.

(21) Appl. No.: 15/052,395

(22) Filed: Feb. 24, 2016

(65) Prior Publication Data

US 2016/0291732 A1 Oct. 6, 2016

(30) Foreign Application Priority Data

Apr. 1, 2015 (CN) .......................... 2015 1 0152680

(51) Int. Cl.
*G06F 3/044* (2006.01)
*G06F 3/041* (2006.01)
*G02F 1/1333* (2006.01)

(52) U.S. Cl.
CPC ............ *G06F 3/044* (2013.01); *G06F 3/0412* (2013.01); *G06F 3/0416* (2013.01); *G02F 1/13338* (2013.01); *G06F 2203/04103* (2013.01)

(58) Field of Classification Search
CPC ...................... G06F 3/044; G06G 2203/04103
(Continued)

(56) References Cited

U.S. PATENT DOCUMENTS

| 4,694,279 A | * | 9/1987 | Meno | ...................... G06F 3/044 307/116 |
| 2004/0178995 A1 | * | 9/2004 | Sterling | .................. G06F 3/044 345/173 |

(Continued)

FOREIGN PATENT DOCUMENTS

| CN | 203643988 U | 6/2014 |
| CN | 204117117 U | 1/2015 |

(Continued)

OTHER PUBLICATIONS

Chinese Application No. 201510152680.3, First Office Action dated Apr. 28, 2017.

*Primary Examiner* — Michael Faragalla
*Assistant Examiner* — Sujit Shah
(74) *Attorney, Agent, or Firm* — Alston & Bird LLP

(57) ABSTRACT

The disclosure provides an array substrate and a method for forming the same, a method for detecting a touch-control operation of a touch-control display apparatus. The array substrate includes: a self-capacitance touch-control layer, which also serves as a common electrode layer; the self-capacitance touch-control layer includes multiple first electrodes and multiple second electrodes, where the first electrodes are smaller in area than the second electrodes; the multiple first electrodes form multiple electrode groups each of which includes at least two of the first electrodes, where the electrode groups and the second electrodes are same in external shape. Accordingly, touch resolution and touch sensitivity of the array substrate may both reach a high level.

13 Claims, 5 Drawing Sheets

(58) Field of Classification Search
USPC .................................................. 345/173–177
See application file for complete search history.

(56) References Cited

U.S. PATENT DOCUMENTS

| | | | |
|---|---|---|---|
| 2007/0075968 A1* | 4/2007 | Hall | G06F 3/046 345/157 |
| 2009/0315850 A1* | 12/2009 | Hotelling | G06F 3/0418 345/173 |
| 2013/0321296 A1* | 12/2013 | Lee | G06F 3/041 345/173 |
| 2013/0332892 A1* | 12/2013 | Matsuki | G06F 3/0488 715/863 |
| 2014/0009438 A1* | 1/2014 | Liu | G06F 1/16 345/174 |
| 2014/0049121 A1* | 2/2014 | Liu | G06F 3/0418 307/650 |
| 2014/0240291 A1* | 8/2014 | Nam | G06F 3/0416 345/174 |
| 2014/0347319 A1* | 11/2014 | Lin | G06F 3/044 345/174 |
| 2015/0002442 A1 | 1/2015 | Woolley | |
| 2016/0306457 A1 | 10/2016 | Ding et al. | |
| 2016/0349869 A1* | 12/2016 | Chang | G06F 3/044 |

FOREIGN PATENT DOCUMENTS

| | | |
|---|---|---|
| CN | 104331210 A | 2/2015 |
| CN | 104360783 A | 2/2015 |

* cited by examiner

ARRAY SUBSTRATE AND METHOD FOR FORMING THE SAME, METHOD FOR DETECTING TOUCH-CONTROL OPERATION OF TOUCH-CONTROL DISPLAY APPARATUS

CROSS-REFERENCE TO RELATED APPLICATIONS

The present application claims priority to Chinese patent application No. 201510152680.3, filed on Apr. 1, 2015 with the State Intellectual Patent Office of the People's Republic of China, and entitled "ARRAY SUBSTRATE AND METHOD FOR FORMING THE SAME, METHOD FOR DETECTING TOUCH-CONTROL OPERATION OF TOUCH-CONTROL DISPLAY APPARATUS", the entire disclosure of which is incorporated herein by reference.

BACKGROUND

Liquid Crystal Displays (LCD) and Organic Light-Emitting Diode (OLED) displays possess advantages such as low radiation, small volume, low energy consumption. Thus, LCD and OLEDs are widely used in information products such as laptops, Personal Digital Assistants (PDA), flat-screen televisions, mobile phones.

Display technology integrating touch-control technology has been gradually spread throughout people's daily life. Nowadays, touch screens are classified based on their structures into three types: external add-on touch screens, surface touch screens and embedded touch screens. The embedded touch screen features touch-control electrodes embedded inside a display panel, which may make the entire module thinner and greatly reduce manufacturing costs of the touch screen. Therefore, many panel manufacturers favor embedded touch screens.

An embedded capacitive touch screen in related art detects a touch position utilizing a mutual capacitance mode and/or a self-capacitance mode. If the embedded capacitive touch screen uses the self-capacitance mode, multiple self-capacitance electrodes may be set in the touch screen, which are disposed on a same layer and mutually insulated. When the touch screen is not touched by some parts of a human body, e.g., a finger, capacitance values of the self-capacitance electrodes remain constant. When the human body touches the screen, capacitance value of each corresponding self-capacitance electrodes being touched becomes a sum of the constant capacitance value plus a human body capacitance value. Within a touch-control time period, a touch-control operation detection chip may determine a touch-control position via detecting capacitance change of each self-capacitance electrode.

In the embedded touch screen employing the self-capacitance mode, touch resolution and touch sensitivity always constrain with each other to form a contradictory. Generally, on one side, if the touch resolution is improved, which means the self-capacitance electrodes shall be formed smaller, the touch sensitivity may reduce; on the other side, if the touch sensitivity is improved by enlarging the self-capacitance electrodes, the touch resolution may reduce.

SUMMARY

The disclosure provides an array substrate and a method for forming the same, a method for detecting a touch-control operation of a touch-control display apparatus. Touch resolution of the touch-control display apparatus may be increased while touch sensitivity may be improved.

In order to solve the problem stated hereinbefore, the disclosure provides an array substrate including a self-capacitance touch-control layer, which may include a common electrode layer. Wherein, the self-capacitance touch-control layer may include multiple first electrodes and multiple second electrodes, where the first electrodes may be smaller in area than the second electrodes. And, the multiple first electrodes form multiple electrode groups each of which includes at least two of the multiple first electrodes, where the electrode groups and the second electrodes may be same in outline.

In order to solve the problem stated hereinbefore, the disclosure provides a method for forming an array substrate including the following steps. A self-capacitance touch-control layer is formed, where the self-capacitance touch-control layer also serves as a common electrode layer. Wherein, the self-capacitance touch-control layer may include multiple first electrodes and multiple second electrodes, where the first electrodes may be smaller in area than the second electrodes. And, the multiple first electrodes form multiple electrode groups each of which includes at least two of the multiple first electrodes, where the electrode groups and the second electrodes may be same in outline.

In order to solve the problem stated hereinbefore, the disclosure provides a method for detecting a touch-control operation of a touch-control display apparatus having the array substrate described above. The method may include the following steps.

If area of a touch region at which an external object touches a screen of the touch-control display apparatus is not larger than that of the first electrode, and if the external object is continuously sliding on the screen, a sliding track of the external object is determined based on a first set of first electrodes and a second set of second electrodes which detect the sliding of the external object. Wherein, the sliding track includes a first set of segments respectively corresponding to the first set of first electrodes and a second set of segments respectively corresponding to the second set of second electrodes. Wherein, each of the first set of segments is determined based on position of the corresponding first electrode in the first set, and each of the second set of segments is determined based on both position of the corresponding second electrode in the second set and positions of one or more of the first electrodes, which are in the first set and adjacent to the corresponding second electrode.

If the area of the touch region is not less than that of the second electrode, and if the external object stay still on the screen, the touch region is determined based on a third set of first electrodes and a fourth set of second electrodes, which detect the external object. Wherein, for each of the first electrodes in the third set, an entire region corresponding to an electrode group to which the corresponding first electrode belongs is used to determine the touch region. And, for each of the second electrodes in the fourth set, a region corresponding to the second electrode itself is used to determine the touch region.

Compared to related arts, the disclosure at least possesses the following advantages: in the array substrate provided in the disclosure, by setting the first electrodes and second electrodes with different areas in the self-capacitance touch-control layer, on one side, touch sensitivity of a touch-control system may be kept at a relatively high level, and a touch-control response time period may be reduced to offer users a better touch-control experience. On the other side, touch resolution of the touch-control system may be kept at a high level, which may apply to a touch operation of objects such as a touch pen, etc. Accordingly, both the touch sensitivity and touch resolution of the array substrate may be kept at a high standard.

DETAILED DESCRIPTION OF THE INVENTION

Figure 1:
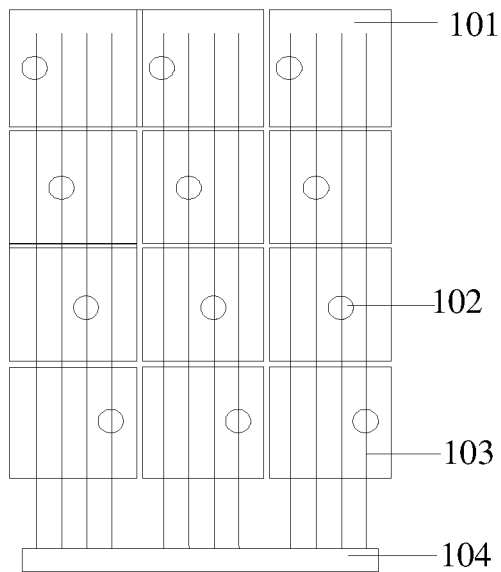
FIG. 1 schematically illustrates an array substrate in prior art.

The inventors have analyzed embedded touch screens using a self-capacitance mode in related arts and discovered that self-capacitance touch electrodes in an array substrate are same in size for the embedded touch screens using the self-capacitance mode in related arts. Referring to FIG. 1, the array substrate in prior art includes multiple equal-area electrodes 101, and the electrodes 101 are one-to-one electrically connected to a chip 104 via transmission wires 103. Wherein, each of the transmission wires 103 is electrically connected to the corresponding electrodes 101 via through holes 102 on an insulting layer (not shown).

In order to guarantee relatively high touch sensitivity, the self-capacitance touch electrodes in the prior arts may generally have a relatively large size. For example, each edge of one of the electrodes 101 is 4 mm. If touching the electrodes by a finger, it may be relatively easy to recognize a touch-control signal generally because the finger is relatively thick. However, when sliding on the electrodes by a touch pen with relatively small area of touch region, for example, writing or drawing on a touch screen using the touch pen, since a nib of the touch pen is thin, the electrodes 101 may not always accurately detect a position where the nip touches. Namely, it may be easy for the nip of the touch pen to generate an error in touch-control operation detection. It is seen that the array substrate in related arts may not be capable of balancing a contradictory between touch resolution and touch sensitivity.

Accordingly, an array substrate and a method for forming the same are provided. The array substrate may include: a self-capacitance touch-control layer, which also serves as a common electrode layer and may include multiple first electrodes and multiple second electrodes, where the first electrodes are smaller in area than the second electrodes; the multiple first electrodes form multiple electrode groups each of which includes at least two of the multiple first electrodes, where the electrode groups and the second electrodes may be same in external shape. Via the first electrodes and second electrodes set with different areas in the self-capacitance touch-control electrode layer, the balance between two aspects that the touch resolution and touch sensitivity may be coordinated. As a result, the touch sensitivity of a touch-control system may be kept at a high standard and reducing a touch-control response time period so as to provide a relatively good touch-control experience to users. In addition, the touch resolution of the touch-control system may be kept at a high level, which may apply to a touch operation of objects such as touch pen.

Furthermore, a method for detecting a touch-control operation of a touch-control display apparatus is provided in the disclosure, and the method may apply to the array substrate provided in the disclosure so as to keep both the touch resolution and touch sensitivity at a high standard.

In order to clarify the objects, characteristics and advantages of the disclosure, embodiments of the disclosure will be described in detail in conjunction with the accompanying drawings. Area of the first electrode and area of the second electrode stated in the following embodiments respectively represent area of a surface of the first electrode and the second electrode, which face the touch screen.

The disclosure provides an embodiment of the array substrate.

Figure 2:
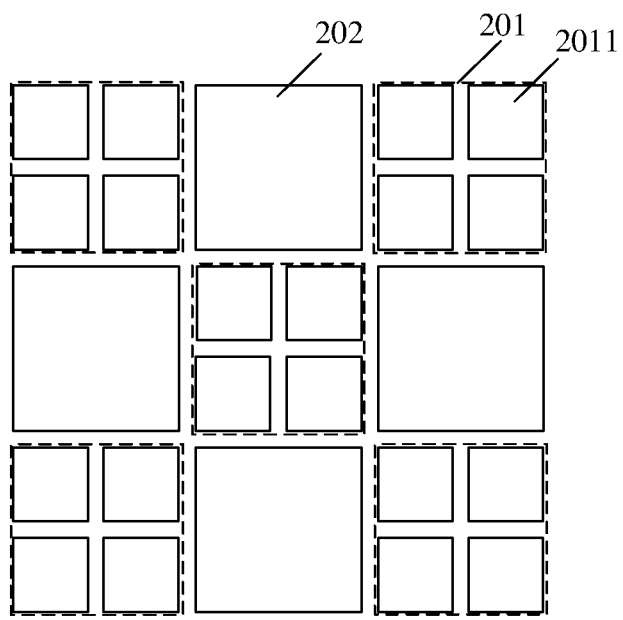
FIG. 2 schematically illustrates a diagram presenting a part of an array substrate according to an embodiment of the disclosure.

FIG. 2 illustrates a diagram presenting a part of an array substrate according to one embodiment of the disclosure. The array substrate (not fully shown) includes a self-capacitance touch-control layer (not labeled). The self-capacitance touch-control layer includes multiple first electrodes 2011 and multiple second electrodes 202, where the first electrodes 2011 are smaller in area than the second electrodes 202. The multiple first electrodes 2011 form one of electrode groups 201, and the electrode groups 201 and second electrodes 202 have a same external shape.

In this embodiment, the self-capacitance touch-control layer also serves as a common electrode layer. Namely, a touch-control stage and a display stage may be included. At the touch-control stage, the self-capacitance touch-control layer may detect a touch operation. At the display stage, the self-capacitance touch-control layer serves as the common electrode layer and may have a function of providing an electric field. In other words, the array substrate may employ a time-sharing driving mode, and during each touch-control operation period, partial time may be used for a display drive, and partial time may be used for a touch-control scan drive.

In this embodiment, FIG. 2 only illustrates a part of the electrodes in the self-capacitance touch-control layer. Specifically, quantity of the first electrodes 2011 and second electrode 202 may be designed based on an actual requirement, which is not limited in the disclosure.

Specifically, the external shape is a shape of an electrode or an electrode group from a top view, which is the shape on a plane shown in FIG. 2. A same external shape represents not only a similar shape but also two shapes that are basically identical in size. Since the electrode groups 201 and second electrodes 202 may have a same external shape, the electrode groups 201 and second electrodes 202 may be arranged in a matrix form, and namely, arranged in an ordered row-column form.

In this embodiment, each dash-line frame surrounds one of the electrode groups 201 to demonstrate the external shape of each of the electrode groups 201.

It is stated in advance that, in figures corresponding to other embodiments, a dash-line frame is also used to surround each electrode group so as to demonstrate the external shape of each electrode group.

Specifically, in this embodiment, each of the first electrodes 2011 and each of the second electrodes 202 may be electrically connected to a corresponding touch-control wire (not shown), where the touch-control wire may electrically connect each of the first electrodes 2011 and each of the second electrodes 202 to a corresponding chip.

In this embodiment, one of the electrode groups may include M·N of the first electrodes arranged in an M rows by N columns form, where M and N are an integer greater than 1. As shown in FIG. 2, one of the electrode groups 201 includes 2·2 of the first electrodes 2011 arranged in 2 rows by 2 columns, and includes 4 of the first electrodes 2011.

In this embodiment, one of the electrode groups 201 includes 4 of the first electrodes 2011, and the one of the electrode groups 201 and one of the second electrodes 202 have a same external shape. Thus, the first electrodes 2011 are smaller in area than the second electrodes 202. Moreover, since an inter-space between each two of the first electrodes may be relatively small, the first electrodes 2011 may be approximately a quarter of the second electrodes 202 in area.

Referring to FIG. 2, the electrode groups 201 and the second electrodes 202 distribute in a matrix form. Moreover, in a same row, one of the second electrodes 202 is disposed between two neighboring electrode groups 201 and one of the electrode groups 201 is disposed between two neighboring second electrodes 202. In a same column, one of the second electrodes 202 is disposed between two neighboring electrode groups 201 and one of the electrode groups 201 is disposed between two neighboring second electrodes 202. In other words, in a same row and a same column, the electrode groups 201 and second electrodes 202 may be alternately arranged.

The array substrate in this embodiment, since the self-capacitance touch-control electrode layer may include the first electrodes 2011 and second electrodes 202 with different areas, an improvement of the touch resolution and touch sensitivity may be realized. Reasons for the improvement are: first, the array substrate may include multiple second electrodes 202 with a larger area so that the touch sensitivity of the whole touch-control system may be kept at a relatively high level; second, since the second electrodes 202 have a larger area than the first electrodes 2011, the total quantity of touch-control electrodes may be relatively small, and thus, a touch-control response time period may be reduced to offer users a better touch-control experience; third, the array substrate may also include the first electrodes 2011 with a smaller area, which may keep the whole touch-control system at a high standard for the touch-control resolution so that the array substrate may apply to the touch-control operation of the objects such as the touch pen.

In the array substrate provided in this embodiment, in a same row and a same column, the electrode groups 201 and second electrodes 202 may be alternately arranged. Thus, the electrode groups 201 and second electrodes 202 may be distributed uniformly, and the entire array substrate may have an equal detection level at each position. The uniformly distributed electrode groups 201 and second electrodes 202 may be in favor of performing a touch-control operation detection, and improve accuracy of the touch-control operation detection.

Specifically, in the array substrate provided in this embodiment, each of the first electrodes 2011 may be electrically connected to a first gain amplifier (not shown), and each of the second electrodes 202 may be electrically connected to a second gain amplifier (not shown). The first gain amplifier has a larger gain coefficient than the second gain amplifier, and the first gain amplifier has a smaller dynamic range than the second gain amplifier. By connecting the first electrodes 2011 and second electrodes 202 to gain amplifiers with different gain coefficients and dynamic ranges, this embodiment may further explore advantages of the first electrodes 2011 and second electrodes 202 so as to further balance the touch resolution and touch sensitivity.

In this embodiment, a ratio of a gain coefficient of the second gain amplifier to a gain coefficient of the first gain amplifier is a first ratio, and a ratio of area of each of the first electrodes 2011 to area of each of the second electrodes 202 is a second ratio, where the first ratio is equal to the second ratio. Since the first electrodes 2011 may be approximately a quarter of the second electrodes 202 in area, the second ratio may be approximately 0.25. Thus, the first ratio may be approximately 0.25. Namely, the first and second gain amplifier with the gain coefficient approximately 0.25 may be selected to be electrically connected to the first electrodes 2011 and second electrodes 202 respectively so that the first electrodes 2011 and second electrodes 202 may achieve an approximately identical touch sensitivity and further improve touch-control performance of the array substrate.

The disclosure further provides a method for forming an array substrate, and the method may form the array substrate stated in the above embodiment, so the method of the embodiment may refer to the corresponding content stated in the above embodiment.

Referring to FIG. 2, the method may include: forming a self-capacitance touch-control layer, and setting the self-capacitance touch-control layer including multiple first electrodes 2011 and multiple second electrodes 202. Setting the first electrodes 2011 smaller in area than the second electrodes 202, and setting the multiple first electrodes 2011 forming one of electrode groups 201. The electrode groups 201 and second electrodes 202 are same in the external shape.

In this embodiment, the self-capacitance touch-control layer also serves as a common electrode layer.

Referring to FIG. 2, one of the electrode groups 201 may be set including 2·2 of the first electrodes 2011, and namely, includes 4 of the first electrodes 2011. It is known referring to the embodiment stated hereinbefore that the first electrodes 2011 may be approximately a quarter of the second electrodes 202 in area.

Referring to FIG. 2, the method may further include: setting the electrode groups 201 and the second electrodes 202 in a matrix form, and in a same row and a same column, one of the second electrodes 202 is disposed between two neighboring electrode groups 201 and one of the electrode groups 201 is disposed between two neighboring second electrodes 202. In other words, in a same row and a same column, the electrode groups 201 and second electrodes 202 may be set alternately arranged. The uniformly distributed electrode groups 201 and second electrodes 202 may be in favor of performing the touch-control operation detection, and improve the accuracy of the touch-control operation detection.

The method for forming an array substrate in this embodiment, via the self-capacitance touch-control electrode layer may be set including the first electrodes 2011 and second electrodes 202 with different areas, the improvement of the touch resolution and touch sensitivity may be realized. Reasons for the improvement are, first, the array substrate may be set including multiple second electrodes 202 with a larger area so that the touch sensitivity of the entire touch-control system may be kept at a relatively high level. Since the second electrodes 202 with a larger area may be set existing, total quantity of touch-control electrodes may be relatively small, thus, the touch-control response time period may be reduced to offer users a better touch-control experience. Second, the array substrate may also be set including the first electrodes 2011 with a smaller area, which may be set keeping the entire touch-control system at a high standard for the touch-control resolution so that the array substrate may apply to the touch-control operation of the objects such as the touch pen.

In the array substrate provided in this embodiment, each of the first electrodes 2011 may be set electrically connected to a first gain amplifier, and each of the second electrodes 202 may be set electrically connected to a second gain amplifier. The first gain amplifier has a larger gain coefficient than the second gain amplifier, and the first gain amplifier has a smaller dynamic range than the second gain amplifier. By electrically connecting the first electrodes 2011 and second electrodes 202 to gain amplifiers with different gain coefficients and dynamic ranges, further explore advantages of the first electrodes 2011 and second electrodes 202 so as to further balance the touch resolution and touch sensitivity.

In this embodiment, the first and second gain amplifier have a gain coefficient of approximately 0.25 may be selected to be electrically connected to the first electrodes 2011 and second electrodes 202 respectively so that the first electrodes 2011 and second electrodes 202 may achieve the approximately identical touch sensitivity and further improve the touch-control performance Reasons for the performance improvement may refer to the corresponding content in the embodiment stated hereinbefore.

The disclosure provides another embodiment of the array substrate.

Figure 3:
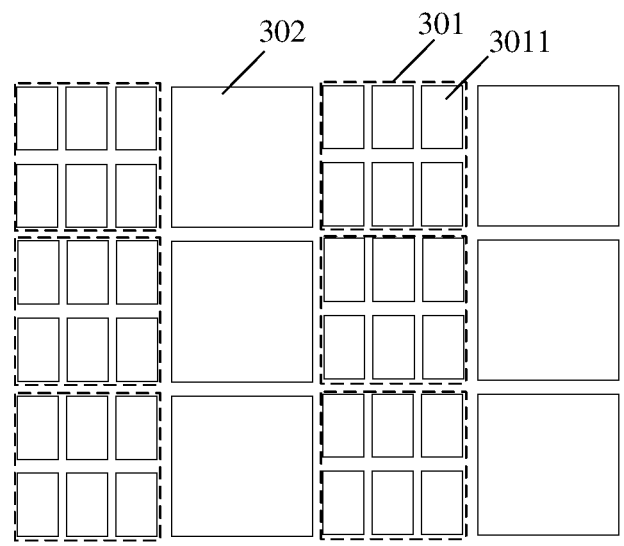
FIG. 3 schematically illustrates a diagram presenting a part of an array substrate according to an embodiment of the disclosure.

FIG. 3 illustrates a diagram presenting a part of an array substrate according to another embodiment of the disclosure. The array substrate (not fully shown) includes a self-capacitance touch-control layer (not labeled). The self-capacitance touch-control layer includes multiple first electrodes 3011 and multiple second electrodes 302, where the first electrodes 3011 are smaller in area than the second electrodes 302. The multiple first electrodes 3011 form one of electrode groups 301, and the electrode groups 301 and second electrodes 302 have a same external shape.

In this embodiment, the self-capacitance touch-control layer also serves as a common electrode layer, and more relevant details may refer to the corresponding content in the embodiment stated hereinbefore.

FIG. 3 only illustrates a part of electrodes in the self-capacitance touch-control layer. The quantity of the first electrodes 3011 and second electrode 302 may be designed based on an actual requirement, which is not limited in the disclosure.

Specifically, the external shape is a shape of an electrode or one of the electrode groups 301 from a top view, and more relevant details may refer to the corresponding content in the embodiment stated hereinbefore.

Specifically, in this embodiment, each of the first electrodes 3011 and each of the second electrodes 302 may be electrically connected to corresponding one of touch-control wires (not shown), and the touch-control wires may electrically connect the first electrodes 3011 and the second electrodes 302 to a corresponding chip.

As shown in FIG. 3, one of the electrode groups 301 includes six of the first electrodes 3011 arranged in a 2 rows by 3 columns form.

In this embodiment, one of the electrodes 201 includes 6 of the first electrodes 3011. Accordingly, the first electrodes 3011 may be approximately one-sixth the second electrodes 302 in area, and more relevant details may refer to the corresponding content in the embodiment stated hereinbefore.

Referring to FIG. 2, the electrode groups 301 and the second electrodes 302 are arranged in a matrix form. Moreover, in a same row, one of the second electrodes 302 is disposed between two neighboring electrode groups 301 and one of the electrode groups 301 is disposed between two neighboring second electrodes 302. In a same column, the electrode groups 301 are disposed in the column entirely or the second electrodes 302 are disposed in the column entirely.

The array substrate provided in this embodiment, since the self-capacitance touch-control electrode layer may includes the first electrodes 3011 and second electrodes 302 with different areas, an improvement of the touch resolution and touch sensitivity may be achieved.

In the array substrate provided in this embodiment, each of the first electrodes 3011 may be electrically connected to a first gain amplifier, and each of the second electrodes 302 may be electrically connected to a second gain amplifier. The first gain amplifier has a larger gain coefficient than the second gain amplifier, and the first gain amplifier has a smaller dynamic range than the second gain amplifier. By electrically connecting the first electrodes 3011 and second electrode 302 to gain amplifiers with different gain coefficients and dynamic ranges, a further balance the touch resolution and touch sensitivity is achieved between the first electrodes 3011 and the second electrode 302.

In this embodiment, a ratio of a gain coefficient of the second gain amplifier to a gain coefficient of the first gain amplifier is a first ratio, and a ratio of area of each of the first electrodes 3011 to area of each of the second electrodes 302 is a second ratio, where the first ratio is equal to the second ratio. Since the first electrodes 3011 may be approximately one-sixth the second electrodes 302 in area, the second ratio may be approximately 0.17. Thus, the first ratio may also be approximately 0.17. The first and second gain amplifier with the approximate gain coefficient 0.17 may be selected to be electrically connected to the first electrodes 3011 and second electrodes 302 respectively so that the first electrodes 3011 and second electrodes 302 may achieve an approximately identical touch sensitivity and further improve the touch-control performance of the array substrate.

The disclosure further provide a method for forming an array substrate, and the method may form the array substrate stated in the above embodiment, so the method of the embodiment may refer to the corresponding content stated in the above embodiment.

Referring to FIG. 3, the method may include: forming a self-capacitance touch-control layer, and setting the self-capacitance touch-control layer including multiple first electrodes 3011 and multiple second electrodes 302. Setting the first electrodes 3011 smaller in area than the second electrodes 302, and setting the multiple first electrodes 3011 forming one of electrode groups 301. The electrode groups 301 and second electrodes 302 are same in the external shape.

In this embodiment, the self-capacitance touch-control layer also serves as a common electrode layer due to the reasons referring to the embodiment stated hereinbefore.

Referring to FIG. 3, one of the electrode groups 301 may be set including 6 of the first electrodes 3011, and specifically six of the first electrodes 3011. It is known referring to the embodiment stated hereinbefore that the first electrodes 3011 may be approximately one-sixth the second electrodes 302 in area.

Referring to FIG. 2, the electrode groups 301 and the second electrodes 302 may be set arranged in a matrix form, and in a same row, one of the second electrodes 302 is disposed between two neighboring electrode groups 301 and one of the electrode groups 301 is disposed between two neighboring second electrodes 302. In a same column, the electrode groups 301 are disposed in the column entirely or the second electrodes 302 are disposed in the column entirely.

The method for forming an array substrate provided in this embodiment, via the self-capacitance touch-control electrode layer may be set including the first electrodes 3011 and second electrodes 302 with different areas, the improvement of the touch resolution and touch sensitivity may be achieved.

Specifically, in the array substrate provided in this embodiment, each of the first electrodes 3011 may be electrically connected to a first gain amplifier, and each of the second electrodes 302 may be electrically connected to a second gain amplifier, although both the first and second gain amplifier are not shown in the figures. The first gain amplifier has a larger gain coefficient than the second gain amplifier, and the first gain amplifier is set to have a smaller dynamic range than the second gain amplifier. By electrically connecting the first electrodes 3011 and second electrode 302 to gain amplifiers with different gain coefficients and dynamic ranges, this embodiment may further explore advantages of the first electrodes 3011 and second electrode 302 and balance the touch resolution and touch sensitivity. In addition, the first and second gain amplifier with the approximate gain coefficient 0.17 may be selected to be electrically connected to the first electrodes 3011 and second electrodes 302 respectively so that the first electrodes 3011 and second electrodes 302 may achieve approximately identical touch sensitivity and further improve the touch-control performance The disclosure provides another embodiment of the array substrate.

Figure 4:
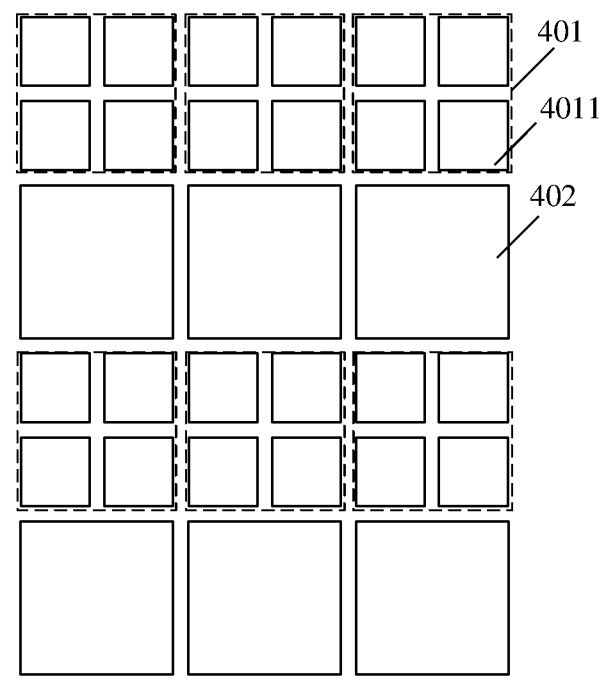
FIG. 4 schematically illustrates a diagram presenting a part of an array substrate according to an embodiment of the disclosure.

FIG. 4 illustrates a diagram presenting a part of an array substrate according to another embodiment of the disclosure. The array substrate (not fully shown) includes a self-capacitance touch-control layer (not labeled). The self-capacitance touch-control layer includes multiple first electrodes 4011 and multiple second electrodes 402, where the first electrodes 4011 are smaller in area than the second electrodes 402. The multiple first electrodes 4011 form one of electrode groups 401, and the electrode groups 401 and second electrodes 402 are same in the external shape. One of the electrode groups 401 includes 4 of the first electrodes 4011 arranged in a 2 rows by 2 columns form, and namely, includes 4 of the first electrodes 4011. Accordingly, the first electrodes 4011 may be approximately a quarter of the second electrodes 402 in area.

In the array substrate provided in this embodiment, each of the first electrodes 4011 may be electrically connected to a first gain amplifier, and each of the second electrodes 402 may be electrically connected to a second gain amplifier, although both the first and second gain amplifier are not shown in the figures. The first gain amplifier has a larger gain coefficient than the second gain amplifier, and the first gain amplifier has a smaller dynamic range than the second gain amplifier. In this embodiment, a ratio of a gain coefficient of the second gain amplifier to a gain coefficient of the first gain amplifier is a first ratio, and a ratio of area of each of the first electrodes 4011 to area of each of the second electrodes 402 is a second ratio, where the first ratio is equal to the second ratio. Since the first electrodes 4011 may be approximately a quarter of the second electrodes 402 in area, the second ratio may be 0.25, approximately. Thus, the first ratio may be also set being 0.25 approximately. Namely, the first and second gain amplifier with the approximate gain coefficient 0.25 may be selected to be electrically connected to the first electrodes 4011 and second electrodes 402 respectively so that the first electrodes 4011 and second electrodes 402 may achieve an approximately identical touch sensitivity and further improve the touch-control performance of the array substrate.

Referring to FIG. 4, the electrode groups 401 and the second electrodes 402 are arranged in a matrix form. Moreover, in a same column, one of the second electrodes 402 is disposed between two neighboring electrode groups 401 and one of the electrode groups 401 is disposed between two neighboring second electrodes 402. In a same row, the electrode groups 401 are disposed in the column entirely or the second electrodes 402 are disposed in the column entirely.

Other structures and characteristics of the array substrate in this embodiment may refer to the corresponding content in the embodiment stated hereinbefore.

The disclosure further provide a method for forming an array substrate, and the method may form the array substrate stated in the above embodiment, so the method of the embodiment may refer to the corresponding content stated in the above embodiment.

Referring to FIG. 4, the method may include: forming a self-capacitance touch-control layer, and setting the self-capacitance touch-control layer including multiple first electrodes 4011 and multiple second electrodes 402. Setting the first electrodes 4011 smaller in area than the second electrodes 402, and setting the multiple first electrodes 4011 forming one of electrode groups 401. The electrode groups 401 and second electrodes 402 have a same external shape. Moreover, one of the electrode groups 401 may be set including 2·2 of the first electrodes 4011, and namely, includes 4 of the first electrodes 4011. Thus, the first electrodes 4011 may be approximately a quarter of the second electrodes 402 in area.

Specifically, in the array substrate provided in this embodiment, each of the first electrodes 4011 may be set electrically connected to a first gain amplifier, and each of the second electrodes 402 may be set electrically connected to a second gain amplifier, although both the first and second gain amplifier are not shown in the figures. The first gain amplifier is set to have a larger gain coefficient than the second gain amplifier, and the first gain amplifier is set to have a smaller dynamic range than the second gain amplifier. By electrically connecting the first electrodes 4011 and second electrode 402 to gain amplifiers with different gain coefficients and dynamic ranges, this balances the touch resolution and touch sensitivity. In addition, the first and second gain amplifier with the gain coefficient approximately 0.25 may be selected to be electrically connected to the first electrodes 4011 and second electrodes 402 respectively so that the first electrodes 4011 and second electrodes 402 may achieve the approximately identical touch sensitivity and further improve the touch-control performance, where the reasons may refer to the corresponding content in the embodiment stated hereinbefore.

Referring to FIG. 4, the electrode groups 401 and the second electrodes 402 may be arranged in a matrix form, and in a same column, one of the second electrodes 402 is disposed between two neighboring electrode groups 401 and one of the electrode groups 401 is disposed between two neighboring second electrodes 402. In a same row, the electrode groups 401 are disposed in the column entirely or the second electrodes 402 are disposed in the column entirely.

Other steps of the method for forming the array substrate in this embodiment may refer to the corresponding content in the embodiment stated hereinbefore.

The disclosure provides another embodiment of the array substrate.

Figure 5:
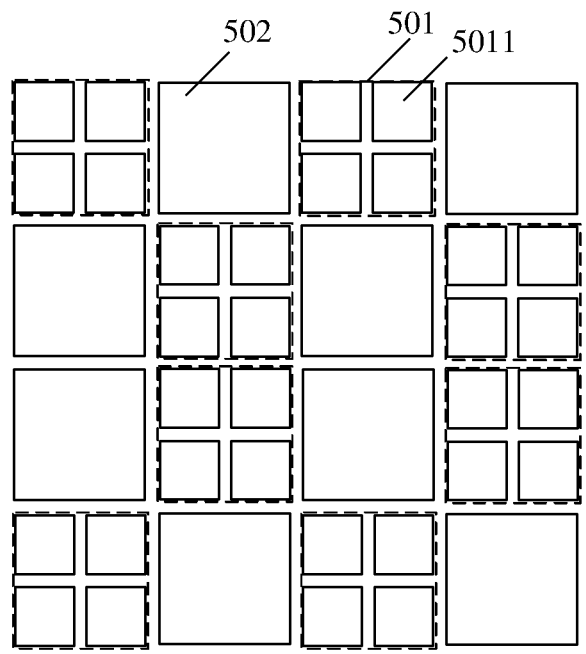
FIG. 5 schematically illustrates a diagram presenting a part of an array substrate according to an embodiment of the disclosure.

FIG. 5 illustrates a diagram presenting a part of an array substrate according to another embodiment of the disclosure. The array substrate (not fully shown) includes a self-capacitance touch-control layer (not labeled). The self-capacitance touch-control layer includes multiple first electrodes 5011 and multiple second electrodes 502, where the first electrodes 5011 are smaller in area than the second electrodes 502. The multiple first electrodes 5011 form one of electrode groups 501, and the electrode groups 501 and second electrodes 502 have a same external shape. One of the electrode groups 501 includes 4 of the first electrodes 5011 arranged in a 2 rows by 2 columns form, and namely, includes 4 of the first electrodes 5011. Accordingly, the first electrodes 5011 may be approximately a quarter of the second electrodes 502 in area.

In the array substrate provided in this embodiment, each of the first electrodes 5011 may be electrically connected to a first gain amplifier, and each of the second electrodes 502 may be electrically connected to a second gain amplifier. The first gain amplifier has a larger gain coefficient than the second gain amplifier, and the first gain amplifier has a smaller dynamic range than the second gain amplifier. In this embodiment, a ratio of a gain coefficient of the second gain amplifier to a gain coefficient of the first gain amplifier is a first ratio, and a ratio of area of each of the first electrodes 5011 to area of each of the second electrodes 502 is a second ratio, where the first ratio is equal to the second ratio. Since the first electrodes 5011 may be approximately a quarter of the second electrodes 502 in area, the second ratio may be approximately 0.25. Thus, the first ratio may be also be approximately 0.25. Namely, the first and second gain amplifier with the gain coefficient approximately 0.25 may be selected to be electrically connected to the first electrodes 5011 and second electrodes 502 respectively so that the first electrodes 5011 and second electrodes 502 may achieve an approximate identical touch sensitivity and further improve a touch-control performance of the array substrate.

Referring to FIG. 5, the electrode groups 501 and the second electrodes 502 are arranged in a matrix form. Moreover, in a same row, the electrode groups 501 and the second electrodes 502 are alternately arranged. In a same row, two electrode groups 501 are arranged consecutively, and two second electrodes 502 are also arranged consecutively.

Other structures and characteristics of the array substrate in this embodiment may refer to the corresponding content in the embodiment stated hereinbefore.

The disclosure further provide a method for forming an array substrate, and the method may form the array substrate stated in the above embodiment, so the method of the embodiment may refer to the corresponding content stated in the above embodiment.

Referring to FIG. 5, the method may include: forming a self-capacitance touch-control layer, and setting the self-capacitance touch-control layer including multiple first electrodes 5011 and multiple second electrodes 502. Setting the first electrodes 5011 smaller in area than the second electrodes 502, and setting the multiple first electrodes 5011 forming one of electrode groups 501. The electrode groups 501 and second electrodes 502 have the same external shape. Moreover, one of the electrode groups 501 may be set including four of the first electrodes 5011, and namely, includes 4 of the first electrodes 5011. Thus, the first electrodes 5011 may be approximately a quarter of the second electrodes 502 in area.

In the array substrate provided in this embodiment, each of the first electrodes 5011 may be electrically connected to a first gain amplifier, and each of the second electrodes 502 may be electrically connected to a second gain amplifier, although both the first and second gain amplifier are not shown in the figures. The first gain amplifier has a larger gain coefficient than the second gain amplifier, and the first gain amplifier has a smaller dynamic range than the second gain amplifier. By electrically connecting the first electrodes 5011 and second electrode 502 to gain amplifiers with different gain coefficients and dynamic ranges, balance of the touch resolution and touch sensitivity is achieved. In addition, the first and second gain amplifier with the approximate gain coefficient 0.25 may be selected to be electrically connected to the first electrodes 5011 and second electrodes 502 respectively so that the first electrodes 5011 and second electrodes 502 may achieve the approximate identical touch sensitivity and further improve the touch-control performance, where the reasons for the performance improvement may refer to the corresponding content in the embodiment stated hereinbefore.

Referring to FIG. 5, the electrode groups 501 and the second electrodes 502 are arranged in a matrix form. Moreover, in a same row, the electrode group 501 and the second electrodes 502 are set alternately arranged. In a same row, two electrode groups 501 are set consecutively arranged, and two second electrodes 502 are also set consecutively arranged.

Other steps of the method for forming the array substrate in this embodiment may refer to the corresponding content in the embodiment stated hereinbefore.

The disclosure provides another embodiment of the array substrate.

Figure 6:
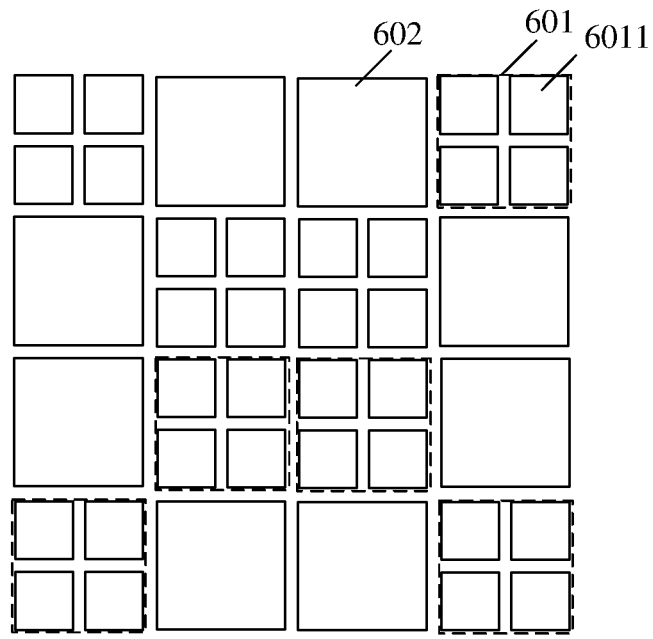
FIG. 6 schematically illustrates a diagram presenting a part of an array substrate according to an embodiment of the disclosure.

FIG. 6 illustrates a diagram presenting a part of an array substrate according to another embodiment of the disclosure. The array substrate (not fully shown) includes a self-capacitance touch-control layer (not labeled). The self-capacitance touch-control layer includes multiple first electrodes 6011 and multiple second electrodes 602, where the first electrodes 6011 are smaller in area than the second electrodes 602. The multiple first electrodes 6011 form one of electrode groups 601, and the electrode groups 601 and second electrodes 602 have a same external shape. One of the electrode groups 601 includes four of the first electrodes 6011 arranged in a 2 rows by 2 columns form, and namely, includes 4 of the first electrodes 6011. The first electrodes 6011 may be approximately a quarter of the second electrodes 602 in area.

Specifically, in the array substrate provided in this embodiment, each of the first electrodes 6011 may be electrically connected to a first gain amplifier, and each of the second electrodes 602 may be electrically connected to a second gain amplifier, although both the first and second gain amplifier are not shown in the figures. The first gain amplifier has a larger gain coefficient than the second gain amplifier, and the first gain amplifier has a smaller dynamic range than the second gain amplifier. In this embodiment, a ratio of a gain coefficient of the second gain amplifier to a gain coefficient of the first gain amplifier is a first ratio, and a ratio of area of each of the first electrodes 6011 to area of each of the second electrodes 602 is a second ratio, where the first ratio is equal to the second ratio. Since the first electrodes 6011 may be approximately a quarter of the second electrodes 602 in area, the second ratio may be approximately 0.25. Thus, the first ratio may be also set being approximately 0.25. Namely, the first and second gain amplifier with the gain coefficient approximately 0.25 may be selected to be electrically connected to the first electrodes 6011 and second electrodes 602 respectively so that the first electrodes 6011 and second electrodes 602 may achieve an approximately identical touch sensitivity and further improve a touch-control performance of the array substrate.

Referring to FIG. 6, the electrode groups 601 and the second electrodes 602 are arranged in a matrix form. Moreover, in a same row, two electrode groups 601 are arranged consecutively, and two second electrodes 602 are also arranged consecutively. In a same column, two electrode groups 601 are arranged consecutively, and two second electrodes 602 are also arranged consecutively.

Other structures and characteristics of the array substrate in this embodiment may refer to the corresponding content in the embodiment stated hereinbefore.

In some embodiments, one of the electrode groups may include M·N of the first electrodes arranged in a form of M rows by N columns, where M and N are integers greater than 1.

In some embodiments, the electrode groups and the second electrodes may be arranged in a matrix form, and in a same row and column, three or less of the electrode groups are arranged consecutively and three or less of the second electrodes are arranged consecutively.

The disclosure further provide a method for forming an array substrate, and the method may form the array substrate stated in the above embodiment, so the method of the embodiment may refer to the corresponding content stated in the above embodiment.

Referring to FIG. 6, the method may include: forming a self-capacitance touch-control layer, and setting the self-capacitance touch-control layer including multiple first electrodes 6011 and multiple second electrodes 602. Setting the first electrodes 6011 smaller in area than the second electrodes 602, and setting the multiple first electrodes 6011 forming one of electrode groups 601. The electrode groups 601 and second electrodes 602 are same in the external shape. Moreover, one of the electrode groups 601 may be set including 4 of the first electrodes 6011, and namely, includes 4 of the first electrodes 6011. Thus, the first electrodes 6011 may be approximately a quarter of the second electrodes 602 in area.

In the array substrate provided in this embodiment, each of the first electrodes 6011 may be electrically connected to a first gain amplifier, and each of the second electrodes 602 may be electrically connected to a second gain amplifier, although both the first and second gain amplifier are not shown in the figures. The first gain amplifier is set to have a larger gain coefficient than the second gain amplifier, and the first gain amplifier is set to have a smaller dynamic range than the second gain amplifier. By electrically connecting the first electrodes 6011 and second electrode 602 to gain amplifiers with different gain coefficients and dynamic ranges, balance of the touch resolution and touch sensitivity is achieved. In addition, the first and second gain amplifier with the gain coefficient approximately 0.25 may be selected to be electrically connected to the first electrodes 6011 and second electrodes 602 respectively so that the first electrodes 6011 and second electrodes 602 may achieve the approximately identical touch sensitivity and further improve the touch-control performance, where the reasons for performance improvement may refer to the corresponding content in the embodiment stated hereinbefore.

Referring to FIG. 6, the electrode groups 601 and the second electrodes 602 distribute in a matrix form. Moreover, in a same row, two electrode groups 601 are set consecutively arranged, and two second electrodes 602 are also set consecutively arranged. In a same column, two electrode groups 601 are set consecutively arranged, and two second electrodes 602 are also set consecutively arranged.

Other steps of the method for forming the array substrate in this embodiment may refer to the corresponding content in the embodiment stated hereinbefore.

In some embodiments, one of the electrode groups may include M×N of the first electrodes arranged in a form of M rows by N columns, where M and N are integers greater than 1. For example, M is 3 and N is 2, or M and N are 3, etc.

In some embodiments, the electrode groups and the second electrodes may be arranged in a matrix form, and in a same row and column, three or less of the electrode groups are arranged consecutively and three or less of the second electrodes are arranged consecutively.

Figure 9:
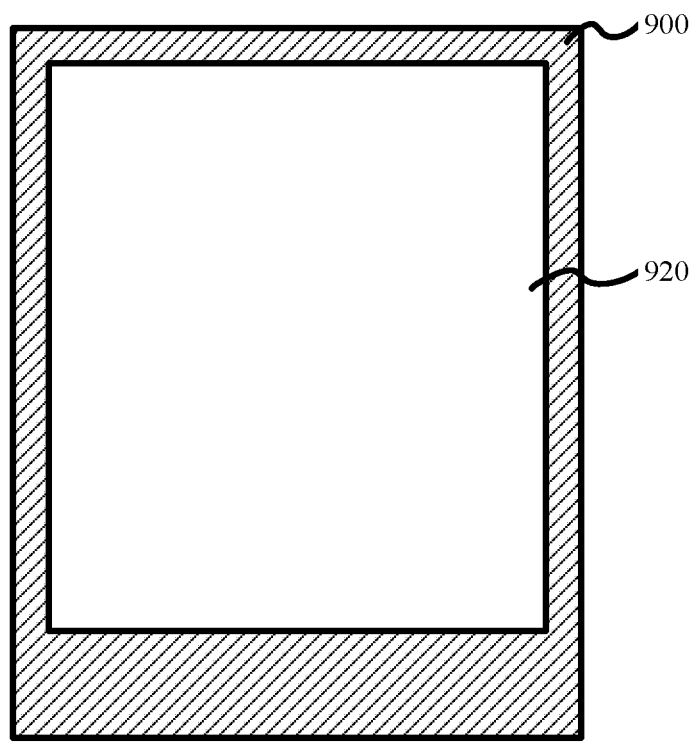
FIG. 9 schematically illustrates a touch-control display apparatus according to one embodiment of the disclosure.

The disclosure further provides a method for detecting a touch-control operation of a touch-control display apparatus. FIG. 9 schematically illustrates a touch-control display apparatus 900 according to one embodiment of the disclosure. The touch-control display apparatus 900 may include the array substrate 920 in any one of the above embodiments. Thereby, in the touch-control display apparatus 900, structures and characteristics of the array substrate 920 refer to the corresponding content in the embodiments stated hereinbefore.

Figure 7:
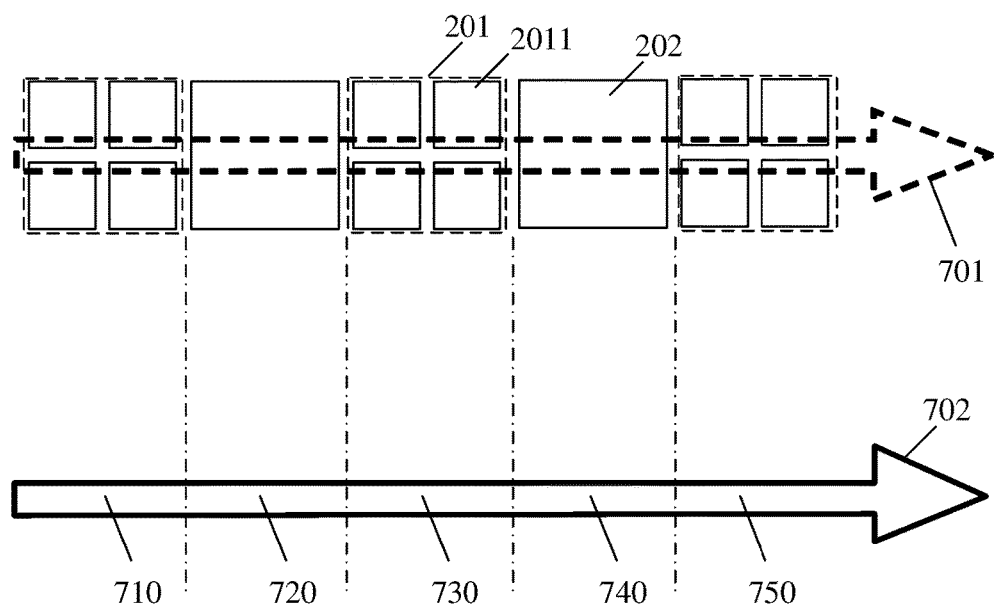
FIG. 7 schematically illustrates a diagram of a method for detecting a touch-control operation of a touch-control display apparatus according to one embodiment of the disclosure.

Referring to FIGS. 2 and 7, this embodiment uses the array substrate shown in FIG. 2 as an example to describe the method for detecting a touch-control operation of a touch-control display apparatus, and FIG. 7 illustrates a diagram of a method for detecting a touch-control operation of a touch-control display apparatus according to one embodiment of the disclosure, which illustrates a part of electrodes shown in FIG. 2.

The method may include: if area of a touch region is not larger than that of each of the first electrodes 2011, and if an external object is continuously sliding on the screen, as shown in FIG. 7, the sliding touch operation consecutively touch multiple first electrodes 2011 and multiple second electrodes 202, where a sliding track formed by the sliding touch operation is represented by a dash-line frame with an arrow 701 shown in FIG. 7. Each of the second electrodes 202 may determine the sliding track based on both position of corresponding one of the second electrodes 202 and positions of one or more of the first electrodes 2011, which are adjacent to the corresponding one of the second electrodes 202. Each of the first electrodes 2011 may determine the sliding track based on position of the corresponding one of the first electrodes 2011.

Referring to FIG. 7, a segment 710, a segment 730 and a segment 750 may be directly acquired by the first electrodes 2011 covered by the dash-line frame 701, and a segment 720 and a segment 740 may be acquired not only by the second electrodes 202 but also by the first electrodes 2011 adjacent to the corresponding second electrodes 202. Finally, a touch-control signal track acquired by the sliding touch operation is represented by a dash-line frame with an arrow 702 shown in FIG. 7.

Specifically, in this embodiment, the area of the touch region represents area of a contacting region of the external object on a touched surface of the touch-control display apparatus. For example, if the touch-control display apparatus is a liquid crystal touch screen and a touch-control operation is performed on the touch screen by employing a touch pen, the area of the touch region is the area of the contacting region of the touch pen on the touched surface of the touch-control display apparatus.

In this embodiment, four of the first electrodes 2011 may form one of the electrode groups 201. The electrode groups 201 may correspond to a high touch-control resolution region. The second electrodes 202 may correspond to a low touch-control resolution region. By collaboratively using a touch-control operation recognition signal of the high and low touch-control operation resolution region, the entire sliding track may be accurately reproduced, and namely, a high accuracy sliding touch-control signal may be acquired via the method.

If the area of the touch region is not smaller than that of each of the second electrodes 202, and if the external object stays still on the touch screen, an entire region corresponding to one of the electrode groups 201, to which at least one of the first electrodes 2011 touched belongs, is used to determine the touch region. A region corresponding to one of the second electrodes 202 is used to determine the touch region. Since the entire region corresponding to one of the electrode groups 201 is used to perform a touch-control operation detection, quantity of signals may be reduced and processing volume of the signals may also be reduced so that the touch sensitivity may become higher, and the response time period become less.

If the area of touch region is larger than the area of each of the first electrodes 2011, and the area of the touch region is smaller than the area of each of the second electrodes 202, and if the external object stay still on the touch screen, the entire region corresponding to one of the electrode groups 201, to which at least one of the first electrodes 2011 touched belongs, is used to determine the touch region. The region corresponding to one of the second electrodes 202 is used to determine the touch region.

In this embodiment, the first electrodes 2011 and the second electrodes 202 may be different in size, which may cause a received touch-control operation signal difference of the first electrodes 2011 and the second electrodes 202. Thereby in this embodiment, each of the first electrodes 2011 may be electrically connected to a first gain amplifier (not shown), and each of the second electrodes 202 may be electrically connected to a second gain amplifier (not shown), where the first gain amplifier has a larger gain coefficient than the second gain amplifier, and the first gain amplifier has a smaller dynamic range than the second gain amplifier.

Specifically, the gain coefficient of the first gain amplifier may range from 2 dB to 10 dB (e.g. 5 dB) and the gain coefficient of the second gain amplifier may range from 1 dB to 2 dB (e.g. 1.5 dB). The first gain amplifier has a smaller dynamic range than the second gain amplifier. Namely, the first gain amplifier may have a narrow dynamic range, and the second gain amplifier may have a wide dynamic range. By modifying the gain coefficient and dynamic range, the detection signal strength of the first electrodes 2011 and the second electrodes 202 may be relatively approaching so as to develop a corresponding touch mode.

In some embodiments, a ratio of a gain coefficient of the second gain amplifier to a gain coefficient of the first gain amplifier is a first ratio, and a ratio of area of each of the first electrodes to area of each of the second electrodes is a second ratio, where the first ratio may be equal to the second ratio.

Figure 8:
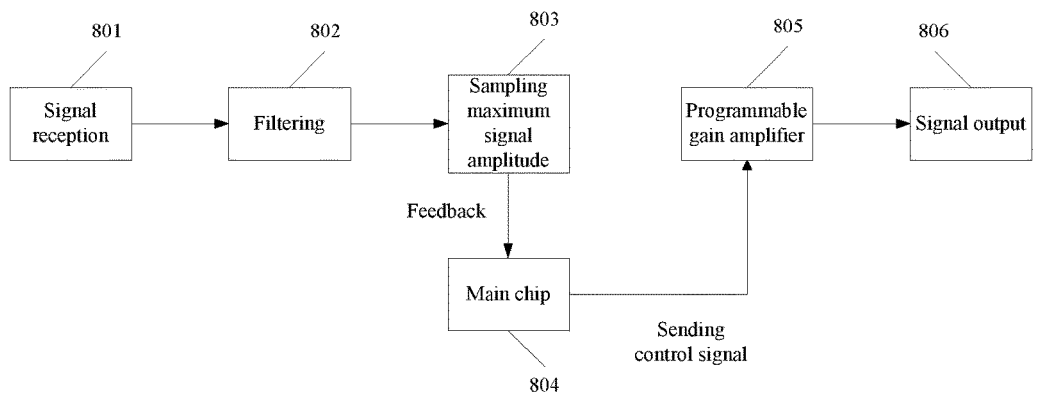
FIG. 8 schematically illustrates a flow diagram of signal processing of a method for detecting a touch-control operation as shown in FIG. 7.

Referring to FIGS. 7 and 8, FIG. 8 illustrates a flow diagram of signal processing of a method for detecting a touch-control operation shown in FIG. 7. Specifically, a step 801 that receiving a touch-control signal is executed, first. Second, a step 802 that filtering the received touch-control signal to erase noise interference is executed. Third, a step 803 is executed, which is determining a maximum amplitude of the filtered touch-control signal so as to acquire a voltage value of the maximum amplitude by sampling and feedback the voltage value to a main chip. Fourth, a step 804 is executed, where the main chip sends a control signal based on the feedback voltage value received so as to realize accurate control to a gain amplifier, and namely, an output signal of the gain amplifier is guaranteed to be stabilized at a determinate value via the main chip. Fifth, a step 805 is executed, where the gain amplifier amplifies a corresponding signal. Finally, a step 806 that outputting the corresponding touch-control signal is executed.

For the method provided in this embodiment, via collaboratively using the first electrodes 2011, the second electrodes 202 and the corresponding method for detecting a touch-control operation, the touch resolution and touch sensitivity may be kept at a high standard.

The disclosure is disclosed, but not limited, by preferred embodiments as above. Based on the disclosure of the disclosure, those skilled in the art can make any variation and modification without departing from the scope of the disclosure. Therefore, any simple modification, variation and polishing based on the embodiments described herein is within the scope of the disclosure.

What is claimed is:

1. A method for detecting a touch-control operation of a touch-control display apparatus, wherein the touch-control display apparatus comprises an array substrate comprising:
   a self-capacitance touch-control layer comprising a common electrode layer;
   wherein the self-capacitance touch-control layer comprises a plurality of first electrodes and a plurality of second electrodes, wherein the plurality of first electrodes each is smaller in area than the plurality of second electrodes each in area;
   a plurality of electrode groups comprising at least two of the first electrodes, wherein the plurality of electrode groups each and the plurality of second electrodes each have a same outline,
   wherein the method comprises:
      when an external object touches an area on a screen of the touch-control display apparatus not greater than an area of one of the plurality of first electrodes, and when the external object is continuously sliding on the screen, determining a sliding track of the external object based on a first set of the plurality of first electrodes and a second set of the plurality of second electrodes which detect the sliding of the external object, wherein the sliding track includes a first set of segments respectively corresponding to the first set of first electrodes and a second set of segments respectively corresponding to the second set of second electrodes, wherein each of the first set of segments is determined based on position of the corresponding first electrode in the first set, and each of the second set of segments is determined based on both positions of the corresponding second electrode in the second set and positions of one or more of said first electrodes, which are in the first set and adjacent to the corresponding second electrode; and when the area of the touch region is not smaller than that of the second electrode, and when the external object stays still on the screen, determining the touch region based on a third set of first electrodes and a fourth set of second electrodes which detect the external object, wherein for each of the first electrodes in the third set, an entire region corresponding to an electrode group to which the corresponding first electrode belongs is used to determine the touch region, and for each of the second electrodes in the fourth set, a region corresponding to the second electrode itself is used to determine the touch region.

2. The method according to claim 1, wherein, when the area of the touch region at which the external object touches the screen of the touch-control display apparatus is greater than that of the first electrode and the area of the touch region is smaller than that of the second electrode, and when the external object stay still on the screen, determining the touch region based on a fifth set of first electrodes and a sixth set of second electrodes which detect the external object, wherein for each of the first electrodes in the fifth set, an entire region corresponding to an electrode group to which the corresponding first electrode belongs is used to determine the touch region, and for each of the second electrodes in the sixth set, a region corresponding to the second electrode itself is used to determine the touch region.

3. The method according to claim 2, wherein, in the array substrate, the plurality of first electrodes each is set electrically connected to a first gain amplifier, and the plurality of second electrodes each is set electrically connected to a second gain amplifier, wherein the first gain amplifier is set possessing a larger gain coefficient than the second gain amplifier, and the first gain amplifier is set possessing a smaller dynamic range than the second gain amplifier.

4. The method according to claim 3, wherein a gain coefficient ratio of the second gain amplifier to the first gain amplifier is a first ratio, and an area ratio of each of the first electrodes to each of the second electrodes is a second ratio, wherein the first ratio is equal to the second ratio.

5. The method according to claim 3, wherein a gain coefficient of the first gain amplifier ranges from 2dB to 10dB.

6. The method according to claim 3, wherein a gain coefficient of the second gain amplifier ranges from 1dB to 2dB.

7. The method according to claim 1, wherein the self-capacitance touch-control layer is configured to detect a touch operation during a touch-control period, and to provide an electric field during a display period.

8. The method according to claim 1, wherein one of the plurality of electrode groups comprises M rows by N columns of first electrodes, wherein M and N are integers greater than 1.

9. The method according to claim 1, wherein the plurality of electrode groups and the plurality of second electrodes are arranged in a matrix form, and wherein three or less electrode groups are arranged consecutively and three or less second electrodes are arranged consecutively in one row or one column.

10. The method according to claim 9, wherein in one row or one column, one of the plurality of second electrodes is disposed between two neighboring electrode groups and one of the plurality of electrode groups is disposed between two neighboring second electrodes.

11. The method according to claim 8, wherein one electrode group has 4 first electrodes in 2 rows and 2 columns, wherein the plurality of first electrodes each has a same area, and wherein a total area of the 4 first electrodes in said electrode group is substantially smaller than an area of each of the plurality of the second electrodes.

12. The method according to claim 8, wherein one electrode group has 6 first electrodes in 2 rows and 3 columns, wherein the plurality of first electrodes each has a same area and a total area of the 6 first electrodes in said electrode groups is substantially smaller than an area of each of the plurality of the second electrodes.

13. The method according to claim 11, wherein each of the plurality of second electrodes has four sides, each side has a length of 4 mm, each of the plurality of first electrodes has four sides, each side has a length less than 2 mm.

\* \* \* \* \*